No. 886,944. PATENTED MAY 5, 1908.
S. E. CHIDISTER.
BRAKE.
APPLICATION FILED FEB. 4, 1907.
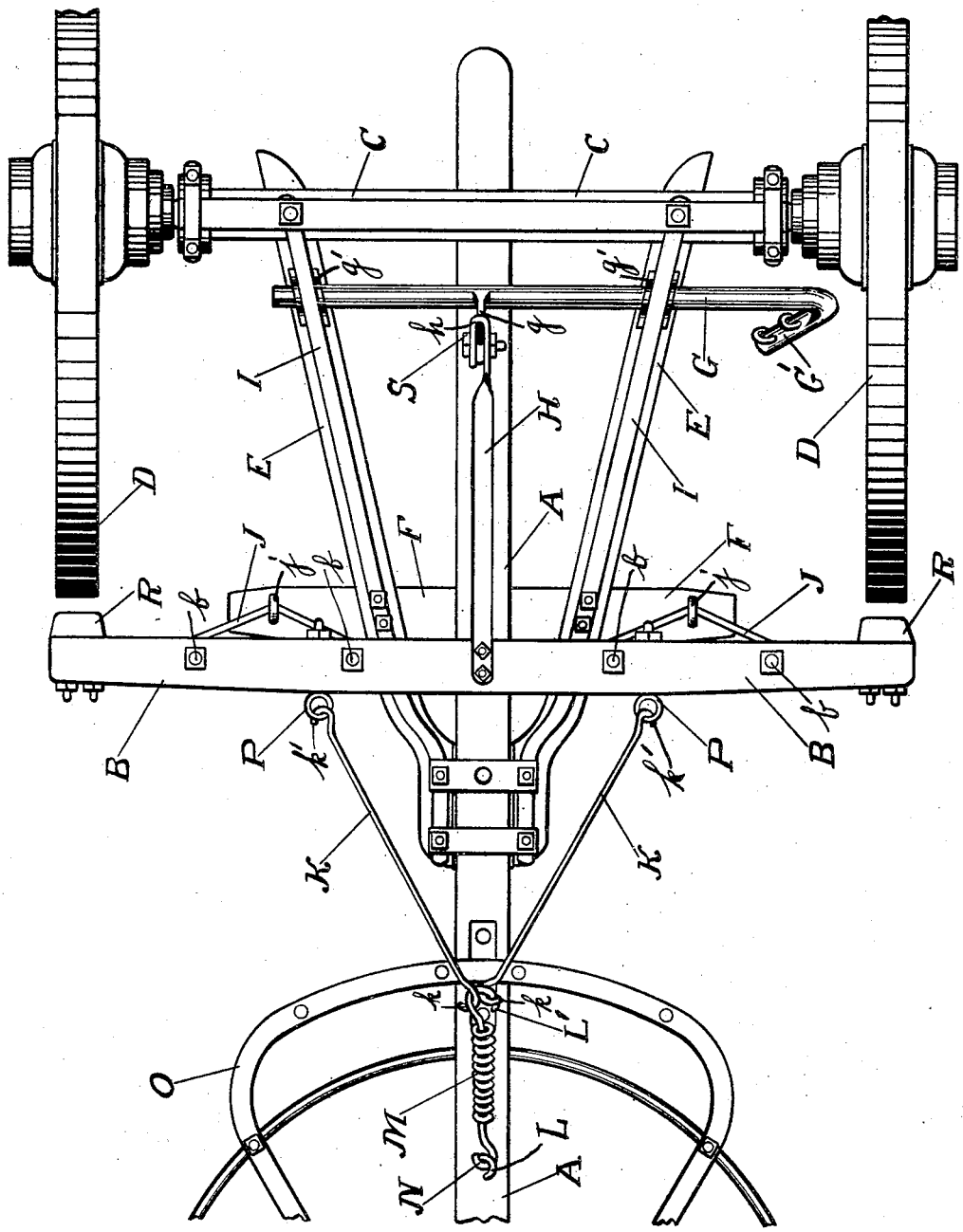
WITNESSES:
Edw. C. Peterke.
Oin Roberts.
INVENTOR
Simons E. Chidister
BY
Sands Calhoun,
ATTORNEY

UNITED STATES PATENT OFFICE.

SIMONS E. CHIDISTER, OF RAMAH, COLORADO, ASSIGNOR OF ONE-THIRD TO B. H. GIVANS, OF PACKWOOD, IOWA.

BRAKE.

No. 886,944.  Specification of Letters Patent.  Patented May 5, 1908.

Application filed February 4, 1907. Serial No. 355,702.

*To all whom it may concern:*

Be it known that I, SIMONS E. CHIDISTER, a citizen of the United States, residing at Ramah, in the county of El Paso, State of Colorado, have invented a new and useful Improvement in Brakes; and I do hereby declare the following to be a full, clear, and exact description of my invention, such as will enable others skilled in the art to which it appertains to make and use the same.

This invention relates to improvements in vehicle brakes, and has for its object the provision of means for partly or entirely preventing the rotary movement of one or more of the traction wheels of a vehicle.

Another object of the invention is the improvement of the construction of a brake device which comprises a minimum number of parts, which is simple and comparatively inexpensive to construct, and is efficient in operation.

With these and other objects in view, the invention consists of certain novel constructions, combinations, and arrangements of parts, as will be hereinafter fully described and claimed.

In the drawings, the figure is an inverted plan view of a device or apparatus constructed in accordance with the present invention.

Referring to the drawings, A designates the coupling pole connected near its rear end to the rear axle C of a vehicle, preferably, a wagon, and its front end is connected to the brace O of an ordinary fifth-wheel structure. The hounds E are connected to the rear axle C and to the coupling pole A intermediate its ends, preferably, near the center thereof. The hounds E are also connected to the axle C by means of irons I.

A transverse brake beam or bar B slidably engages, preferably, the coupling pole and is supported in engagement with said pole through the medium of a cross-piece or auxiliary bar F, which bar F is connected to the brake beam or bar B through the medium of substantially V-shaped hangers or brackets J. Each of these brackets J has its upper portion connected by an eye-bolt $j$ to the auxiliary beam or cross-piece F near one end, and the lower ends of said bracket are connected to the brake-beam or bar B at $b$. It will be noted that a pair of these V-shaped brackets are employed, and by means thereof, the brake beam or bar is slidably suspended upon the coupling pole. Near the ends of the brake beam or bar B are shoes R which are adapted to engage the tread or tire of the traction wheels D.

For the purpose of drawing the brake beam or bar towards the traction wheels D, a strap-iron H is fixedly secured at its inner end to the center of the brake beam or bar B, and its outer end $h$ is formed with a substantially U-shaped portion, in which is pivotally mounted a lug $g$, which is, preferably, integral with the rotatable shaft G. The shaft G is provided at one end with an upwardly-turned or bent portion G', to which may be secured any suitable means whereby rotary movement may be imparted to the shaft G, journaled in bearings $g'$, for drawing the brake beam or bar B longitudinally of the coupling pole and causing the shoes R to engage and clamp the traction wheel D.

An eye-bolt L is secured to the under face of the coupling pole A near its front end, and the front hook N of spring M is attached to the eye-bolt L and the rear hook L' of said spring M is connected to the front hooks $k$ of rods K, which rods converge from the front ends towards their rear ends, the rear ends of rods K terminate in hooks $k'$, which hooks $k'$ are adapted to engage eye-bolts P. The eye-bolts P are secured to the brake beam or bar B. By means of the spring M, diverging rods K, and brake beam or rod B, the shoes R are normally held away from the tread or tire of the traction wheels D, although by rotating the shaft G in one direction, the shoes R may be clamped or forced against the wheels D. Furthermore, it will be noted that from the peculiar construction of the single spring M and the diverging rods K, the brake beam or bar is retained in an even transverse position.

What I claim is:

In a device of the character described, the combination with traction wheels and coupling pole, of a brake-bar slidably mounted below said coupling pole, a cross-piece positioned above said coupling pole, V-shaped brackets positioned between said cross-piece and brake-bar, each bracket having its ends extending vertically through said brake-bar, means attaching only the center of each bracket to only the lower face of said cross-piece, diverging rods positioned contiguous to said brake bar, means securing the inner ends of said rods to said brake bar upon opposite sides of the coupling pole, a spring, means detachably securing the inner end of said spring to the ends of said diverging rods, means securing the outer end of said spring to said coupling pole, and means for manually drawing the brake bar towards said wheels.

In testimony whereof I have signed this specification in the presence of two subscribing witnesses.

S. E. CHIDISTER.

Witnesses:
 JOSEPH V. SMITH,
 WM. N. CHIDISTER.